United States Patent
Gleixner

(10) Patent No.: US 9,981,442 B2
(45) Date of Patent: May 29, 2018

(54) METHOD FOR PRODUCING A MULTILAYERED PREFORM AND A PREFORM

(71) Applicant: INOTECH Kunststofftechnik GmbH, Nabburg (DE)

(72) Inventor: Josef Gleixner, Regensburg (DE)

(73) Assignee: Inotech Kunststofftechnik GMBH, Nabburg (DE)

( * ) Notice: Subject to any disclaimer, the term of this patent is extended or adjusted under 35 U.S.C. 154(b) by 109 days.

(21) Appl. No.: 13/742,020

(22) Filed: Jan. 15, 2013

(65) Prior Publication Data

US 2013/0129955 A1    May 23, 2013

Related U.S. Application Data

(62) Division of application No. 12/952,027, filed on Nov. 22, 2010, now Pat. No. 8,795,566.

(30) Foreign Application Priority Data

Sep. 1, 2010 (DE) .......................... 10 2010 036 103

(51) Int. Cl.
*B32B 1/02* (2006.01)
*B65D 1/02* (2006.01)
(Continued)

(52) U.S. Cl.
CPC ............... *B32B 1/02* (2013.01); *B29B 11/14* (2013.01); *B29C 45/1671* (2013.01);
(Continued)

(58) Field of Classification Search
CPC ...... B32B 1/02; B65D 1/0215; B65D 1/0261; B65D 1/00; B65D 1/0002; B29C 45/00;
(Continued)

(56) References Cited

U.S. PATENT DOCUMENTS 3,543,338 A    12/1970  Cooper
4,116,606 A *  9/1978   Valyi .................. B29C 49/6409
                                                             425/526

(Continued)

FOREIGN PATENT DOCUMENTS

EP             0503086 A1 *  9/1992  ............. B26B 11/08
FR   WO 2008125698 A1 * 10/2008  ............. B29B 11/14
WO       WO2007014588         2/2007

OTHER PUBLICATIONS

Third-Party Submission Under 37 CFR 1.290 corresponding to U.S. Appl. No. 12/952,027, filed Dec. 13, 2012.
(Continued)

*Primary Examiner* — Lee E Sanderson
(74) *Attorney, Agent, or Firm* — Lathrop Gage LLP

(57) ABSTRACT

The invention relates to a multi-component injection molding method for producing a sleeve-shaped preform as well as to a perform which has at least two layers, said method comprising at least two process steps including at least two cavities and at least one injection mold core that can be used for both cavities, and wherein during the first process step, the first layer which has at least one first and at least one second area extending partially in the circumferential direction of the preform, is injected onto the injection mold core within the first cavity, with the second area having a substantially lower layer thickness than the first area, and during the second process step, the second layer is deposited on the first layer which is located on the injection mold core in the second cavity in such a way that only the second area of the first layer is completely covered by the second layer, or during the first process step, the first area of the first layer is deposited partially on the injection mold core within the first cavity, with the remaining areas being covered by the second layer during a second process step within a second cavity.

23 Claims, 4 Drawing Sheets

(51) Int. Cl.
*B29B 11/14* (2006.01)
*B29C 45/16* (2006.01)
*B29B 11/08* (2006.01)
*B29L 17/00* (2006.01)

(52) U.S. Cl.
CPC ........ *B29C 45/1684* (2013.01); *B65D 1/0215* (2013.01); *B29B 11/08* (2013.01); *B29B 2911/1402* (2013.01); *B29B 2911/1408* (2013.01); *B29B 2911/1414* (2013.01); *B29B 2911/14026* (2013.01); *B29B 2911/14093* (2013.01); *B29B 2911/14113* (2013.01); *B29B 2911/14273* (2013.01); *B29B 2911/14326* (2013.01); *B29B 2911/14333* (2013.01); *B29B 2911/14446* (2013.01); *B29B 2911/14466* (2013.01); *B29B 2911/14506* (2013.01); *B29C 2045/1673* (2013.01); *B29L 2017/00* (2013.01); *Y10T 428/13* (2015.01); *Y10T 428/1352* (2015.01); *Y10T 428/1393* (2015.01)

(58) Field of Classification Search
CPC ..... B29C 45/16; B29C 47/00; B29C 45/1684; B29B 2911/14; B29B 11/00; B29B 11/14; B29B 2911/14033

USPC .......... 428/35.7, 36.7, 36.6, 36.91; 215/12.1
See application file for complete search history.

(56) References Cited

U.S. PATENT DOCUMENTS

| | | | |
|---|---|---|---|
| 4,307,137 A * | 12/1981 | Ota | B29C 45/14778 264/246 |
| 4,347,209 A | 8/1982 | Suzuki | |
| 4,646,925 A | 3/1987 | Nohara | |
| 4,935,184 A | 6/1990 | Sorensen | |
| 6,051,295 A | 4/2000 | Schloss et al. | |
| 2002/0058114 A1* | 5/2002 | Sung | B29C 45/1684 428/35.7 |
| 2005/0025943 A1 | 2/2005 | Krappe et al. | |
| 2005/0170113 A1* | 8/2005 | Hill | 428/35.7 |
| 2005/0255269 A1* | 11/2005 | Jacobs | 428/35.7 |
| 2006/0210746 A1 | 9/2006 | Shi et al. | |
| 2007/0182562 A1* | 8/2007 | Abbott et al. | 340/572.8 |
| 2008/0063823 A1* | 3/2008 | Tanaka | B29C 47/20 428/35.7 |
| 2008/0110774 A1 | 5/2008 | Chisholm et al. | |
| 2008/0129514 A1 | 6/2008 | Chisholm | |
| 2008/0241447 A1* | 10/2008 | Shi | 428/35.7 |
| 2009/0032996 A1 | 2/2009 | Orden | |
| 2009/0134229 A1 | 5/2009 | Huang | |
| 2010/0092711 A1* | 4/2010 | Atance Orden | B29C 45/1625 428/36.91 |
| 2012/0052226 A1 | 3/2012 | Gleixner | |

OTHER PUBLICATIONS

German Patent Examination Report corresponding to German Patent Application No. 102010036103.8, a related application, dated Nov. 17, 2016, 3 pages.
U.S. Appl. No. 12/952,027, filed Nov. 22, 2010, now U.S. Pat. No. 8,795,566, Aug. 5, 2014.

* cited by examiner

METHOD FOR PRODUCING A MULTILAYERED PREFORM AND A PREFORM

CROSS-REFERENCE TO RELATED APPLICATIONS

This application is a divisional of U.S. patent application Ser. No. 12/952,027, filed Nov. 22, 2010, which claims priority under 35 USC 119(a) to German Patent Application No. 10-2010-036-103.8 filed on Sep. 1, 2010, each of which is incorporated by reference in its entirety herein.

The present invention relates to a multi-component injection moulding method for producing a sleeve-like/sleeve-shaped preform as well as to a multilayered preform according to the preambles of claims 1 and 9.

It is known that commercial preforms are used for producing a plastic container such as for example a PET drinks bottle, by applying a hot medium onto the performs, for example in a stretch/blow moulding system, and subsequently blowing up and moulding the preforms into the desired container within a mould.

To this end, these preforms only have a single layer, so that the containers subsequently moulded therefrom have a correspondingly thin wall.

Further, the commercial containers have a wall thickness that is essentially the same in the circumferential and the longitudinal directions, whilst, if necessary, the bottom area may have a slightly greater wall thickness than the remaining areas, which is the result of the expansion of the preform in the stretch/blow moulding system. The wall thickness of the container, which is essentially identical in the circumferential and the longitudinal directions, is achieved due to the essentially uniform wall thickness or layer thickness of said one layer of the preform.

The preform is obtained as a result of injecting, in a single-component injection moulding method, only one plastic layer onto a core located in a cavity or in an injection mould. Since the core is centrically positioned in the cavity, it is surrounded prior to the injection by a defined air space over its entire circumference, which air space is completely filled during the injection process by the first plastic layer and later consequently determines the wall thickness of the preform and thus also the wall thickness of the container which is then produced from the preform.

The application of a second layer onto a first layer during the production of a preform by means of a two-component injection moulding process requires specific knowledge for example of the expansion coefficients of the layers used, said layers usually being plastic layers such as PET layers.

For example, if a container is to consist of two layers which have different colourings from each other, the preform will correspondingly have to consist of at least two layers of different colours.

In order to make it possible for the two layers to have different colourings, chemical additives such as carbon black are admixed to each plastic layer which may have a substantial effect on the expansion behaviour of the plastics during the stretching and blow moulding process.

Accordingly, it may occur that a first layer expands at a slower rate than a second layer and consequently rips or is damaged during the container production process, as a result of which the container can no longer be used for example for containing a medium.

Also the strong or inseparable bond of the two layers to each other, in particular during the stretching/blow moulding process, is an indispensable precondition for the production of a two-colour preform or container.

WO 2008/125709 A1, for example, describes a method for producing a two-component preform as well as the preform itself. The injection apparatus used has two injection moulds, the first injection mould of which has an element for spacing the core from the mould wall. To start with, the first layer is deposited on the core in the first injection mould, and subsequently a second layer is poured over it in the second injection mould. Both layers may have different colourings. The preform which has a customary shape that is generally known in the prior art, is made from PET or PP, and additives such as titanium oxide or carbon are used for the colouring of the individual layers. The second layer may extend over the entire circumference either of the entire preform or just over a defined bottom area of the preform. If the second layer completely covers the first layer, it will serve as a light or gas barrier, whereas the second layer which is attached to the closed bottom area of the preform, is merely used for reinforcing the bottom area, for example due to the second layer including a different material to the first layer. A specific colouring or an individual colour scheme or a reinforcement of defined partial areas of the preform by means of the second layer is not possible with the method disclosed in WO 2008/125709 A1.

Accordingly, it is the object of the present invention to provide a method for producing a multilayer preform as well as a perform, which enables an individual colouring for an unambiguous identification of the containers produced from the preform as well as predefined reinforced partial areas for stabilisation or for better usability of the containers made from the preforms to be achieved.

According to the present invention, this object is achieved by means of a method as claimed in claim 1 and a preform as claimed in claim 9.

The multi-component injection moulding method for producing a sleeve-like preform according to the invention, which includes at least two layers, comprises at least two process steps including at least two cavities and at least one injection mould core usable for both cavities, wherein during the first process step, the first layer which has at least one first area and at least one second area partially extending in the circumferential direction of the preform, is injection-moulded onto the injection mould core within the first cavity. The second area has a substantially reduced layer thickness compared to the first area. During the second process step, in the second cavity the second layer is deposited on the first layer located on the injection mould core in the in such a way that only the second area of the first layer is completely covered by the second layer, or during the first process step, the first area (2a) of the first layer (2) is partially deposited on the injection mould core within the first cavity and the remaining areas are covered by the second layer (3) during a second process step within a second cavity.

A multi-component injection moulding method is characterised for example by the production of at least one two-layer plastic preform, however, it is also possible for more than two layers to be arranged on top of each other in a radial direction or next to each other in the circumferential and/or longitudinal direction(s).

This means that the at least one first layer, which forms the inner surface of the preform, does not necessarily have to be formed from a first continuous layer. It is also conceivable for the first layer to consist for example of two layers having different material compositions, wherein for example the one first layer forms the upper open area for example with a thread, whereas the second first layer forms a bottom closed area of the preform and both layers are adjacent or adhere to each other in a predefined area, in order to form the sleeve-like shape of the preform as is generally known in the prior art. The same applies also to the formation of the second layer or a possible third or fourth layer.

Consequently, the at least two layers may be deposited in such a way that they are not arranged on top of each other in the radial direction but next to each other. Thus, these two layers form a single uniform and continuous layer, wherein the second layer fills those areas on the injection mould core, that were not covered by the first layer.

This requires an exact gating/sprue of the second layer on the joint, i.e. onto the transition area of the first layer, in order to avoid the formation of tears or unevenness during the blow moulding and stretching of the preform into a container.

In this way it is possible to produce a preform made from at least two components, which has a very low layer thickness and at the same time ensures customised colouring.

The number of layers that form the preform is not limited. However, in order to enhance the understanding of the subsequent description, it is assumed that only two layers are used.

It is further noted that not only the sleeve-like shape of the preform, which is generally known from the prior art, can be produced in a multi-component injection moulding process, but any desired shape. The shaping only depends on the shape of the injection mould or the cavity and the shape of the injection mould core or the core.

Moreover, the invention is not limited to just two process steps, since it is quite conceivable that for instance a third and fourth layers could be deposited on the first or second layer of the preform in a third or a fourth process step.

During a first process step, the injection mould core or core is introduced into a cavity which is closed for example by a corresponding design at one end of the core or by means of another device which is not explained in more detail herein.

Such a system may for example include a plurality of cavities or injection moulds which may be formed depending on the manufacturer's or the client's requirements either to be identical or to be different from each other. Thus it is possible that a so-called multi-component injection tool includes a plurality of injection moulds or cavities, in order to mould a large number of preforms at the same time.

If the cavity is hermetically sealed, a plastic mass forming the first layer, which may include additives as a function of the desired colouring, is injected into the first cavity under a predefined pressure. The plastic mass either expands completely within the space available to it around the core, in order to form in this way a continuous first layer of the preform, or the first layer expands on the core only up to a predefined area, in order to cover only this area of the preform, so that the core is covered by the first layer only partially during the first injection moulding process or the first process step.

If the first variant is selected, namely that the first layer completely expands on the core within the first cavity in order to form a completely continuous first layer, it is possible that the first layer, by way of a predefined shaping of the first cavity, includes a first and second areas, wherein the second area having a substantially lower layer thickness or wall thickness of the layer than the first area.

This means that second areas are formed for example by protrusions and first areas are formed for example by depressions, which are arranged in the cavity and which extend from the inner surface of the cavity essentially in a radial direction towards the inside (protrusions) or towards the outside (depressions), in order to reduce (protrusions) or increase (depressions) in this way the deposition of material on this predefined area.

Thus, it is possible for the first cavity to have either protrusions or depressions or alternatively both protrusions and depressions at the same time, and in the latter case the depressions will then have to be arranged directly on the protrusions, in order to avoid the formation of a third intermediate area.

In a preferred embodiment example, the cavity has protrusions in defined areas of the cavity so as to be able to form partially occurring second areas of the first layer.

The protrusions and depressions may extend in any desired direction and length in the circumferential and/or longitudinal direction(s) of the internal surface of the cavity. They are arranged depending on customers' requirements with regard to the colouring of the future container on the internal surface of the cavity.

Moreover, it is possible for the protrusions and depressions to extend also in any desired length radially inwards or outwards, so that for example in the case of at least two protrusions being present in a cavity, both protrusions have a different extension in the radial direction towards the inside.

Further, the radial extension of the protrusion towards the inside for example over the length of a protrusion may be different, so that layer thickness differences within the second area of the first layer occur. The same may also apply to the depressions.

According to the second variant, wherein the first layer may expand only partially on the core during the first injection process within the first cavity, flowing of the first layer into certain areas of the cavity through walls or the like of the cavity is prevented for example by means of a cavity shaped as per the definition of the required colouring. Accordingly, the cavity has for example at least one protrusion which extends from the inner surface of the cavity radially towards the inside and is so pronounced that the protrusion rests on the core at least in sections, in order to interrupt a flow of the first layer in this position. In this connection it is further conceivable that to this end, the cavity may include also several gate areas, so that the partial first layer areas can be formed essentially at the same time.

According to the first variant, once the first layer having at least one first area and at least one second area has been deposited or injected/spray-applied or poured onto the core, the second layer is deposited onto the first layer in a second process step within a second cavity. To this end, however, the second layer is injected/spray-applied only on or in to the second areas of the first layer, which were formed by the protrusions, in such a way that the second layer and the first areas of the first layer form a planar external surface of the preform.

To this end, the second cavity preferably has an inner surface which is directly adjacent to the outer surface of the first area of the first layer, i.e. it touches it so that during the deposition of the second layer, no plastic mass of the second layer can be injected/spray-applied onto the outer surface of the first area of the first layer.

Further, the second cavity may, depending on the arrangement of the second areas of the first layer, include several injection openings, through which a plastic mass provided for this purpose is injected/spray-applied onto each second area. In this context, also different plastic masses having the most varied material compositions may be used, which will later impart to the container either a multi-coloured colour scheme or predefined properties such as for example an enhanced feel when a first defined area is touched, and a softer mass in a second area for a reliable standing of the container on a slippery surface.

As materials for the first and/or the second layer(s) according to the first and second variants, preferably polyethylene terephthalate (PET), thermoplastic elastomer (TPE) or polyurethane is used.

The second layer is consequently injected/spray-applied onto the second areas in such a way that the second layer completely fills the second areas in a radial direction as well as in the circumferential direction of the preform, until the filling level of the second layer reaches the level of the outer surface of the first layer (the length which extends in a radial direction from the inner surface to the outer surface of the first area of the first layer).

Thus, the outer surface of the first area of the first layer and the outer surface of the second layer terminate on each other without forming a warp or a notch or an overrun region.

Preferably, the remaining heat of the first layer that is still cooling down is utilised to facilitate the injection/spraying of the second layer onto the first layer or onto predefined areas of the first layer.

As a result of the possibility of depositing the second layer onto the first layer in a second process step, it is also conceivable that the second layer consists of a recyclable material which is generated for example from a previously used, recycled or melted-down plastic container.

This second layer of the preform, which consists of recycled material, however, will not come into contact with the medium that is later introduced into the container that is expanded from the preform. By using recycled material as the second layer, cost savings may be realised during the production of the preform.

Once the at least two layers have been deposited on the core for forming the preform, the preform has a wall thickness which is essentially identical in the longitudinal and the circumferential directions.

Since the second area of the first layer preferably has a layer thickness which continuously reduces in the circumferential and/or longitudinal direction(s) of the preform at least in sections, the second layer consequently has to be injected/spray-applied onto the second area of the first layer in such a way that accordingly the second layer has a layer thickness which essentially continuously increases in the circumferential and/or longitudinal direction(s) of the preform at least in sections, in order to form the counterpart to the second area of the first layer.

By means of a second layer deposited in this way, which preferably has a different colouring or colour to the first layer, it is for example possible for the second layer to enable a colour scheme for example from dark red to be achieved in areas having a great layer thickness to light red in areas having a small layer thickness, because the layers are stretched by the stretching/blow moulding process in such a way that a reduction of the layer thickness and thus a possible reduction of the colour intensity of the colour of the second layer occurs.

The second area of the first layer has an outer surface as well as joining areas which are adjacent to the first layer and extend essentially radially outwards, which joining areas connect intimately with an inner surface of the second layer as well as with the joining areas extending radially from the inner surface to the outer surface of the second layer due to an adhesive or mechanical bond.

Accordingly, a bond occurs not only between the outer surface of the second area of the first layer and the inner surface of the second layer, but also between the transitional areas generated by the shape of the two areas of the first layer and the edge zones of the second layer.

The transitional areas between the first and second areas are wall sections which occur as a result of the reduced material in the second area and as a result of the reduced layer thickness present as a result of this compared to the first area, which wall sections extend essentially radially from the second area outwards or extend radially from the first area inwards.

These transitional areas form the joining areas in which the second layer meets the first area of the first layer essentially vertically relative to the lateral surface of the preform.

However, the joining areas may also correspondingly run out, as a result of which the area extends for example not radially outwards, but is characterised by an area which extends outwardly at an obtuse angle.

According to the second variant, the second layer, which may have a different material composition and/or colouring to the first layer, is deposited on the areas of the core that were not covered by the first layer during the first process step in a second process step within a second cavity. To this end, the second cavity has for example an inner surface which lies directly on top of the outer surface of the first layer when the core is introduced into the second cavity with a partially deposited first layer. Thus, an over-moulding of the first layer with the second layer may be prevented. To this end, the second cavity may have a plurality of injection or gate devices arranged on the cavity, in order to introduce the second layer only into the areas within the second cavity that are not yet covered by the first layer.

The second layer deposits itself onto the core in a manner identical to the first layer and bonds with the first layer as a result of the second layer flowing up to the edges or the joining areas of the first layer, which joining areas extend outwards from the core in a radial direction, and connects with these joining areas in such a way that these areas will not rip open or form voids or holes even when the preform is blown up into a container.

According to the second variant, however, it is further conceivable that the two layers which are arranged next to each other on the core in the radial direction are deposited on the core at the same time during a process step or an injection/spraying process and immediately bond with each other.

Moreover, the description of two layers is meant to include the possibility that also three or more layers may be used here, each of which may have different material compositions and/or colourings.

The use of partially different materials for the second layer, for example in the area of the bottom, may lead to an increase in the strength or the tensile yield strength. Thus, for example, the bottom of the preform or the later container may be specially reinforced or for example the thread of the preform may have an enhanced heat distort resistance. Accordingly, as a result of the partial arrangement of the second layer on the first layer of the preform, stretching in these partial areas of the preform may be increased.

In a preferred embodiment, the injection mould core, onto which the first and second layers of the preform are injected/spray-applied and which is arranged on a rotary plate, is moved into or out of the first or second cavity in an essentially translational movement of the rotary plate or of the cavity along a longitudinal axis of the first and/or second cavity.

The injection mould core or the core may for example be positioned on a rotary plate or a rotary table in such a way that its longitudinal axis is arranged parallel to the rotary axis of the rotary plate. Accordingly, the core extends vertically upwards or downwards from the surface of the rotary plate.

It is also conceivable that the core is arranged on the rotary plate in such a way that its longitudinal axis extends vertically to the rotary axis of the rotary plate, so that its longitudinal axis is orientated essentially parallel to the surface of the rotary plate, wherein the core preferably extending at least in sections beyond the edge of the rotary plate.

In both arrangement cases, for example at least two cores may be arranged on a rotary plate, said cores preferably lying opposite each other on the rotary plate, so that the surface of the rotary plate may be divided into exactly two equal halves by the arrangement of the cores.

Thus, the rotary plate may be arranged for example before or on the cavities in the injection moulding machine in such a way that the longitudinal axis of the rotary plate extends either parallel to the longitudinal axis of the cavity which forms the centre or the central point of the opening or extends through it, or that the longitudinal axis of the rotary plate extends vertically to the longitudinal axis of the cavity.

If the longitudinal axis of the rotary plate extends parallel to the longitudinal axis of the cavity and accordingly preferably also to the longitudinal axis of the core, the at least two cavities are arranged in the injection moulding machine for example next to each other in a horizontal direction or on top of each other in a vertical direction, and their openings are orientated in the same direction.

However, if the longitudinal axis of the rotary plate is arranged vertically to the longitudinal axis of the cavity and thus also vertically to the longitudinal axis of the core, the at least two cavities are arranged for example opposite one another in the injection moulding machine, wherein the two openings of the cavity being respectively orientated in opposite directions of the respective other cavity opening.

In both arrangement examples of the rotary plate relative to the cavities, the rotary plate may be supported in such a way that as a result of the translational movement of the rotary plate along the longitudinal axis of the cavity, the core may be moved into the first cavity for example prior to the first process step and, upon injection moulding of the first layer, back out of the first cavity in a further translational movement of the rotary plate in the opposite direction relative to the first translational movement of the rotary plate.

For example, once the first layer has been deposited on the core, the core is transported together with the first layer deposited thereon into a second cavity.

To this end the injection mould core, onto which the first and second layers of the preform are injected/spray-applied and which is arranged on a rotary plate, is moved between the individual cavities by means of an essentially rotational movement of the rotary plate about an axis which is either parallel or vertical relative to the longitudinal direction of the cavity.

This means that the rotary plate carries out a rotary movement about the rotary axis of preferably 180°, in order to transport or move the core taken out of the first cavity together with the first layer in front of the opening of the second cavity.

Once the core with the first layer is located in front of the opening of the second cavity, the rotary plate carries out another translational movement in order to move the core into the second cavity, so that the second layer may be deposited on at least the second areas of the first layer.

However, it would also be conceivable for the rotary plate to carry out only a rotational movement, in order to transport the cores positioned thereon in front of the respective openings of the cavities, and for the cavities to carry out the translational movement for receiving the core in the internal area of the cavities prior to the injection process and for discharging the core out of the internal area of the cavities after the injection process.

It is also conceivable for the cores to be arranged on transport elements that are movable in a translational direction relative to the longitudinal axis of the core, said transport elements being connected to the rotary plate in order to introduce the cores into the respective cavities or to take them out of the cavities upon the rotary movement of the rotary plate in order to orientate the cores in front of the cavities.

It is further possible that a chip, a further plastic element, a metallic element, a magnet, a transponder, an electronic or electrically conductive element and/or a fluorescent element, which is arranged on or embedded in a film that dissolves and releases the element for use, is inserted in the first or second cavity and is over-moulded with the first or second layer or is injected between the first and second layers during the first or second process step.

To this end, the element which is preferably arranged on a film or is surrounded by a film, is arranged for example in a predefined area inside the first cavity, in order to be either completely over-moulded by the first layer, for example by the first area of the first layer, or in order to be only back-moulded for example with the second area of the first layer.

If the element is completely over-moulded, the film, which for example surrounds the element in order to protect it from contamination or damage during transport and storage, completely dissolves, as a result of which the element can now be used.

If the element is only back-moulded, the film will preferably not dissolve yet, since the element is not yet completely surrounded by the injection mass which it is supposed to protect from contamination and damage in the future. The film will in this case not dissolve until during the second process step, when the second layer is injected/spray-applied onto the second areas of the first layer.

It is also conceivable for the element to be introduced into the second cavity or deposited on the first layer until prior to the second process step, in order to be surrounded or over-moulded only by the second layer.

By means of the elements embedded in the layers of the preform, for example a simple identification of the containers made from the preform for example at the point of sale becomes possible, or the elements support the subsequent manufacturing process by such information that enables the container treatment plant to recognize which kind of container it is and which treatment steps are necessary for the container.

Moreover, pigments such as for example lasers and/or colour and/or nano-pigments may be specially applied onto the surface of the preform, which are deposited for example onto the outer surface of the first and/or second layer(s) after the first injection process or process step or onto the outer surface of the second layer and/or the first area of the second layer after the second injection process for example by means of a laser.

Since a preform generally known from the prior art preferably includes a thread that is used to apply a corresponding closure cap onto the container produced from the preform, in order to protect the contents of the container from unwanted contamination, it is also necessary to mould such a thread onto the preform.

The thread is preferably moulded onto the first layer of the preform during the first process step by means of the first layer or is moulded onto the preform in a process step following the first and/or second process step(s) using a plastic material that differs from the at least two layers.

This means that the thread is formed either from the material of the first layer or from a material that differs from that of the first and second layers.

The thread preferably has no second areas that are covered by the second layer. However, it is also conceivable for the thread to be made from the material of the second layer.

Further, a preform is claimed which is produced using the multi-component injection moulding method described above.

The preform according to the invention for producing containers, including a sleeve-like mould body that has a thread on an open end which is located opposite the end closed in the longitudinal direction of the mould body, consists of at least two thermoplastic elastomer layers, each of which has at least one inner surface and at least one outer surface, wherein the layers have the same or different material compositions and wherein the first layer has a first area and at least one second area extending partially in the circumferential direction of the preform, with the layer thickness of the second area being substantially smaller than the layer thickness of the first area and with the second layer covering the second area of the first layer or with the first layer (2, 2*a*) and the second layer (3) having an essentially identical layer thickness and being adjacent to each other at least in the circumferential direction of the preform (1).

In a preferred embodiment example, the first layer and the second layer have colourings that are at least partially different from each other.

Thus, for example, the first layer has a white colouring and the second layer has a red colouring.

Moreover it is possible for the first layer and/or the second layer to be a hard component or a soft component.

Accordingly, for example, two layers may consist of a hard component or a soft component or the first layer is a hard component and the second layer is a soft component or the first layer is a soft component and the second layer is a hard component.

In one embodiment example, a film, a chip, a further plastic element, a metallic element, a magnet, a transponder, an electronic or electrically conductive element and/or a fluorescent element is arranged within the first layer or the second layer and/or between the first layer and the second layer of the preform according to the invention.

Here, the film is preferably a PET film which surrounds for example an element or an insert such as a chip or a Fresh controller and which completely melts during the injection process due to the heat of the injected plastic mass, in order to enable the element to be embedded in an area predetermined for the element.

The thread of the preform according to the invention includes at least partially a high strength material that is essentially different from the material used for the at least two layers.

It is further conceivable for the outer surface of the first area of the first layer and/or the outer surface of the second layer to have an essentially abrasion-resistant labelling or graphic which is applied by means of hot-foil stamping, pad printing, screen-printing and/or by using a laser.

This labelling or graphic has to be applied to the preform in such a way that, when the preform is later blown or stretched into a container, the corresponding graphic does not run or distort. So that apart from the elements that are injected into the first and the second layer, the preform can have additional identification and/or advertising markings, so that the preform as well as the later container will become easy to identify.

In order to achieve for example a better grip or to optimise the feel to touch of the container or an extraordinary design or some enhanced functionality, such as for example enhanced standing stability of the container even on an uneven surface, the outer surface of the first area of the first layer and/or the outer surface of the second layer of the preform according to the invention may have at least partially a roughened contour or a contour that has concave or convex curvatures/concavities or prisms having pointed or rounded extensions.

Moreover, the preform according to the invention may have as a second layer for example a soft layer or a softer layer than the first layer e.g. in the area of the bottom of the preform, in order to enable slip inhibition of the container for example on a smooth or uneven surface.

Further advantages, aims and characteristics of the present invention will be explained below by means of the description of the attached drawings, in which the preform according to the invention, by way of examples in different stages of manufacture, as well as an embodiment of the preform according to the invention are illustrated together with an element on a PET film.

Components which in the figures at least essentially match with regard to their function, may here be identified with the same reference numerals, however, these components will not always have to be identified and explained in all of the figures.

Figure 1:
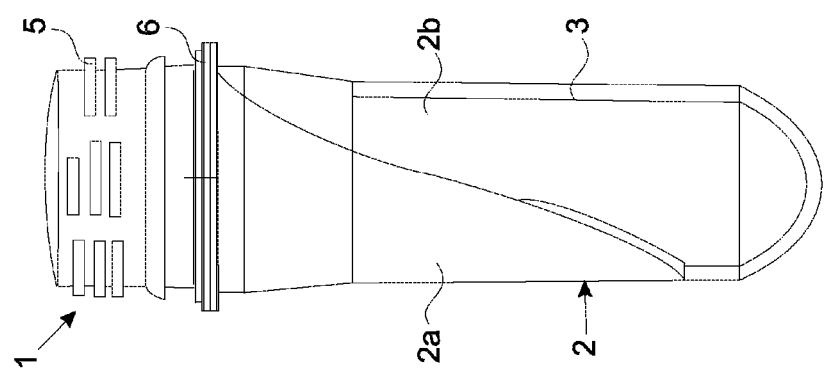
FIG. 1 shows a schematic sketch of a first lateral view of an embodiment of the preform according to the invention having a first and a second layer.

FIG. 1 shows a schematic sketch of a first lateral view of an embodiment of the preform 1 according to the invention having a first 2, 2*a*, 2*b* and a second 3 layers. The sleeve-like preform 1 has a thread 5 in the upper area in the longitudinal direction of the preform 1, which thread was preferably moulded onto the first layer 2 out of the material of the first layer 2. Below the thread there is a flange 6 which was also preferably moulded onto the first layer 2 out of the material of the first layer 2. The first layer 2 has a first area 2*a* and a second area 2*b*. A second layer 3 lies directly on the outside of the outer surface of the second area 2*b* of the first layer 2 in a radial direction and completely fills this area, so that the preform 1 has a uniform outer surface in the circumferential and the longitudinal directions.

Figure 2:
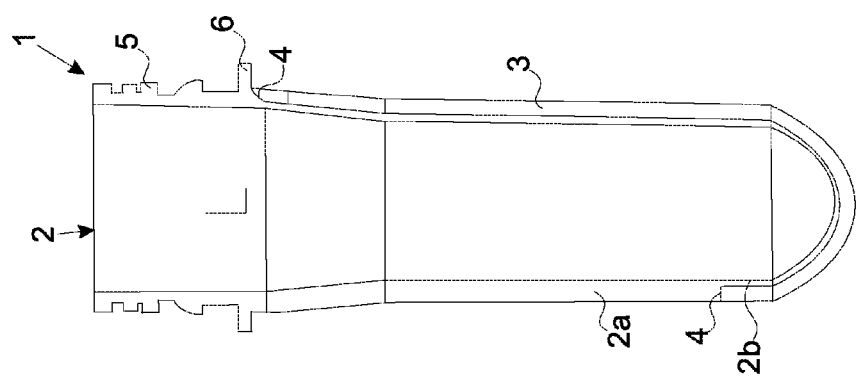
FIG. 2 shows a schematic sketch in a view of a longitudinal section through the embodiment of FIG. 1 of the preform according to the invention having a first and a second layer.

FIG. 2 shows a schematic sketch of a view of a longitudinal section of the embodiment of FIG. 1 of the preform 1 according to the invention having a first 2, 2*a*, 2*b* and a second 3 layers. In this view it can clearly be seen that the layer thickness or wall thickness of the first area 2*a* of the first layer 2 is significantly greater than the layer thickness of the second area 2*b* of the first layer 2. This difference in layer thicknesses is compensated by the second layer 3 which is arranged on the outer surface of the second area 2*b* of the first layer 2 in such a way that it completely fills the second areas 2*b* up to the joining areas 4, so that the preform essentially has the same layer thickness in the circumferential and the longitudinal directions over the first 2 and the second 3 layers.

It can further clearly be seen in FIG. 2 that the thread 5 and the flange 6 are made from the material of the first layer 2 and are moulded onto the first layer 2, and further that they are not covered by the second layer 3.

Figure 3:
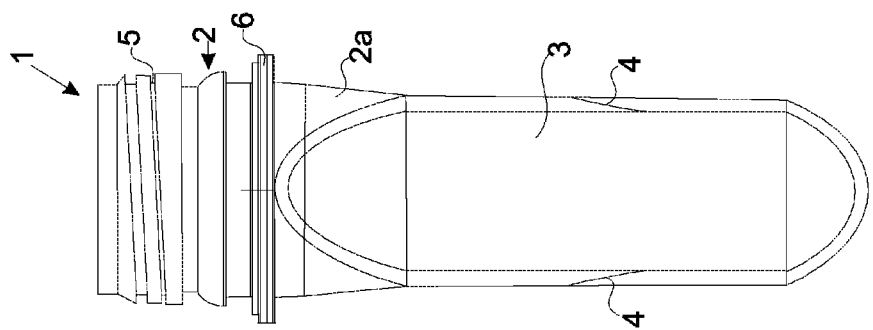
FIG. 3 shows a schematic sketch of a second lateral view of the embodiment of FIG. 1 of the preform according to the invention having a first and a second layer.

FIG. 3 shows a schematic sketch of a second lateral view of the embodiment of FIG. 1 of the preform 1 according to the invention having a first 2, 2*a*, 2*b* and second 3 layers, with the second layer 3 being clearly visible in this view, whereas the first area 2*a* of the first layer 2 only occupies a minimum upper portion of the preform 1. The second layer 3, which is disposed in or on the second areas (not shown here) of the first layer, terminate without forming an overrun area into the joining areas 4 with the first area 2*a* of the first layer 2.

Consequently, the joining areas 4 or the joining area 4 is/are a circumferential edge which is generated relative to the formation of the second area 2*b* of the first layer 2 and which separates the second area 2*b* of the first layer 2 from the first area 2*a* of the first layer 2.

The term circumferential is to be understood herein to mean that the edge 4 or the joining area 4 has no beginning and no end but extends in a continuous way along the circumferential and/or the longitudinal direction(s) as a function of the desired colouring of the preform 1.

Figure 5:
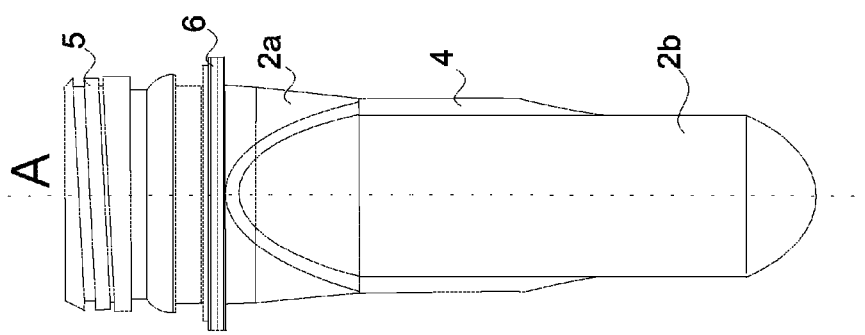
FIG. 5 shows a schematic sketch of a second lateral view of the embodiment of FIG. 1 of the preform according to the invention having only one first layer.
Figure 4:
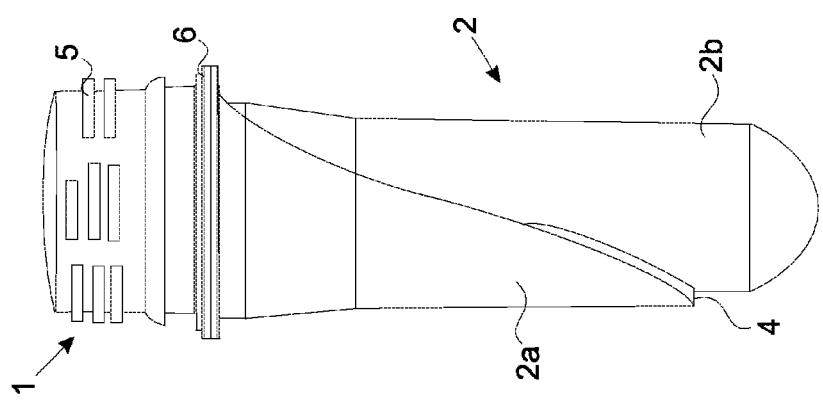
FIG. 4 shows a schematic sketch of a first lateral view of an embodiment of FIG. 1 of the preform according to the invention having just one first layer.

FIGS. 4 and 5 each show a schematic sketch of a first and a second lateral view of the embodiment of FIG. 1 of the preform 1 according to the invention having only one first layer 2, 2*a*, 2*b*. FIGS. 4 and 5 clearly show the areas 2*a*, 2*b* of the first layer 2, which differ from each other with regard to their layer thicknesses, with the first area 2*a* of the first layer 2 having a greater layer thickness than the second area 2*b*.

The joining area 4 also forms here a circumferential edge 4 which extends both in the circumferential direction and in the longitudinal direction around the preform 1 and separates the first area 2*a* from the second area 2*b*.

To this end, the joining area 4 has a height which extends essentially radially outwards and which essentially corresponds to the difference in layer thicknesses between the first area 2*a* and the second area 2*b* in such a way that the layer thickness of the first area 2*a* subtracted from the layer thickness of the second area 2*b* essentially corresponds to the height of the joining area 4.

Figure 6:
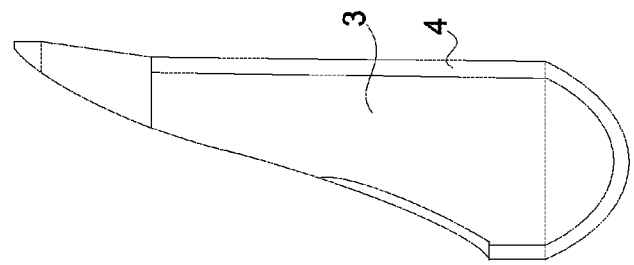
FIG. 6 shows a schematic sketch of a cut-out of a first layer of the embodiment of FIG. 1 of the preform according to the invention.

FIG. 6 shows a schematic sketch of a cut-out of a second layer 3 of the embodiment of FIG. 1 of the preform 1 according to the invention. If the preform 1 shown in FIG. 5 is subdivided into two parts along its longitudinal axis A and if then only the second layer 3 is taken from these two parts, the cut-out of the second layer 3, which is shown in FIG. 6, will be obtained.

The cut-outs of the second layer 3 can be very different as a function of the desired colouring of the preform 1 or the later container, the configuration possibilities are unlimited.

Figure 7:
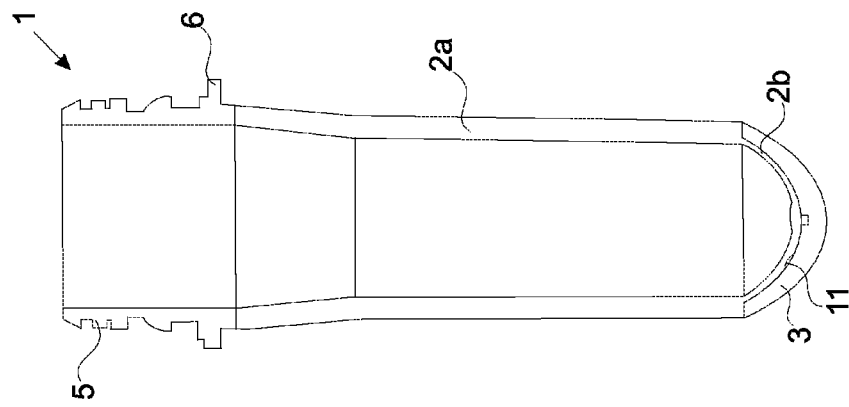
FIG. 7 shows a schematic sketch of a principle structure of an embodiment of the preform according to the invention with an embossed film and element.

FIG. 7 shows a schematic sketch of a principle structure of a further embodiment of the preform 1 according to the invention having an embossed film 10 and an element 11. The film 10 is here preferably a PET film 10, however, it may also be made from materials which dissolve under certain ambient temperatures and may have for example a recess 14 or a hole 14. The film 10 is normally pre-formed and will be deposited in this embodiment onto the outer surface of the second area 2*b* of the first layer 2. This means that the film 10 or the element 11 is injected between the second area 2*b* of the first layer 2 and the second layer 3. To this end, the second area 2*b* may have a protrusion 13 or a nose 13 as well as a depression 12 or an embedding area 12. The embedding area 12 has for example the same shape as the element, which is for example an RFID chip or a magnet.

The pre-embossed film 10 with the element 11 is deposited onto the second area 2*b* in such a way that the depression 14 is guided over the protrusion 13 and the element 11 is inserted into the embedding area 12 of the second area 2*b* of the first layer 2. Subsequently, the second layer 3, which in FIG. 7 is only schematically shown, is injected onto the film 10 with the element 11 during a further injection/spray-applied process. The film 10 completely melts due to the heat or the pressure of the second injection mass, as a result of which only the element 11 will remain in the embedding area 12 between the second layer 2 and the second area 2*b* of the first layer 2.

Figure 8:
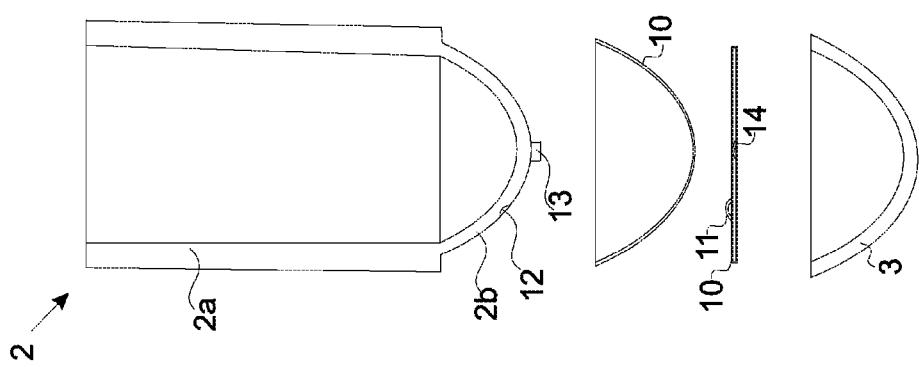
FIG. 8 shows a schematic sketch of the embodiment shown in FIG. 7 of the preform according to the invention in an assembled condition.

FIG. 8 shows a schematic sketch of the embodiment of the preform 1 according to the invention, as shown in FIG. 7 in an assembled view, in which it becomes clearer that the film (not shown here) is no longer positioned between the second layer 3 and the second area 2*b* of the first layer 2, but only the element 11 is located in the embedding area 12.

In this embodiment, the element 11 is located at the bottom end, in the vertical direction, of the preform or the bottom area thereof, so that even after expanding the preform into a container, this element will remain in the bottom area of the container. Thus, the number of containers transported over a predefined area may be detected for example by means of a magnet scanner in the container treatment system.

Figure 9:
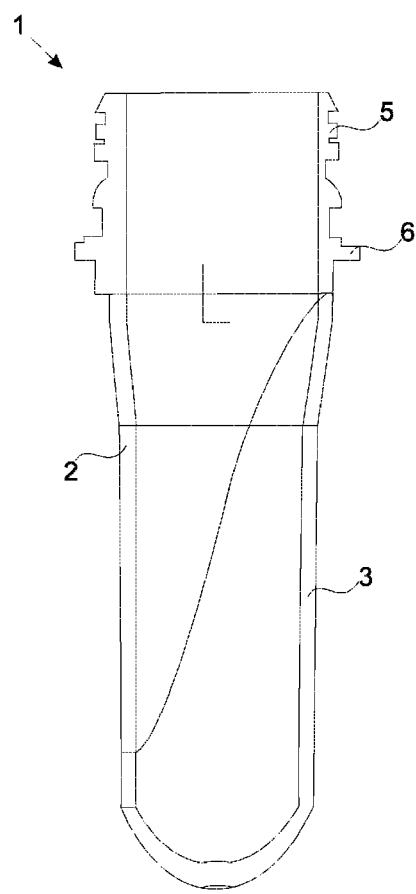
FIG. 9 shows a schematic sketch of an embodiment of the preform according to the invention having two layers arranged in a radial direction next to each other on the core.

FIG. 9 shows a schematic sketch of an embodiment of the preform 1 according to the invention having two layers 2, 3 positioned next to each other on the core in a radial direction. Here, the first layer 2 is not formed to be continuous or extending around the entire circumference of the core, but has only a partial area of the preform, in this example the upper open area with the thread 5 and the flange 6, with the second area, i.e. the lower closed area of the preform 1 being formed by the second layer 3.

Thus, both layers 2, 3 have essentially the same layer thickness and are adjacent to each other not only in the longitudinal direction, but also in the circumferential direction of the preform 1.

Contrary to the examples described above, the second layer 3 does not rest here on an area of the first layer 2, but is injected on the core directly onto the areas remaining after the first injection process, i.e. onto the areas which are not yet covered with the first layer 2.

All of the features disclosed in the application documents are claimed as being essential to the invention in as far as they are novel over the prior art either individually or in combination.

LIST OF REFERENCE NUMERALS

1 Preform
2 First layer
2a First area of the first layer
2b Second area of the first layer
3 Second layer
4 Joining area
5 Thread
6 Flange
10 Film
11 Element
12 Embedding area
13 Protrusion
14 Depression

I claim:

1. A preform (1) for producing containers, including a sleeve-like mould body which has a thread (5) on an open end that is opposite a closed end in the longitudinal direction of the mould body and that comprises at least two thermoplastic elastomer layers (2, 2a, 2b, 3), each of which have at least one inner and at least one outer surface, wherein the closed end comprises an outer surface,
characterised in that the first layer (2, 2a, 2b) and second layer (3) have different material compositions, and wherein the second layer (3) is applied after the first layer (2, 2a, 2b), and wherein the second layer (3) has a layer thickness which varies in the circumferential and/or longitudinal direction(s) of the preform (1) at least in sections,
and wherein the first layer (2, 2a, 2b) has a first area (2a) and at least one second area (2b) extending at least partially in the circumferential direction of the preform, wherein the layer thickness of the second area (2b) is lower than the layer thickness of the first area (2a) and wherein the second layer (3) covers only the second area (2b) of the first layer (2, 2a, 2b),
and wherein the preform (1) has a wall thickness which is essentially constant in the longitudinal and the circumferential directions, wherein the second layer (3) constitutes the outer surface of the closed end of the preform, wherein the first layer (2, 2a, 2b) forms the inner layer of the preform (1) and is formed as a completely continuous layer in the longitudinal and the circumferential directions of the preform (1),
wherein in a plane arranged perpendicular to the longitudinal direction of the preform (1), the first layer (2) is arranged with a varying layer thickness in the circumferential direction of the preform (1), wherein the plane intersects the first area (2a) of the first layer (2) and is located between the thread (5) and the closed end of the preform (1).

2. The preform (1) as claimed in claim 1, characterised in that the first layer (2, 2a, 2b) and the second layer (3) have colourings that are at least partially different from each other.

3. The preform (1) as claimed in claim 1, characterised in that the first layer (2, 2a, 2b) is a harder component than the second layer (3).

4. The preform (1) as claimed in claim 1, characterised in that a film (10), a chip (11), a further plastic element (11), a metallic element (11), a magnet (11), a transponder (11), an electronic or electrically conductive element (11) and/or a fluorescent element (11) is arranged within the first layer (2, 2a, 2b) or the second layer (3) and/or between the first layer (2, 2a, 2b) and the second layer (3).

5. The preform (1) as claimed in claim 1, characterised in that the thread (5) has at least partially a material that is substantially different from the materials used for the at least two layers (2, 2a, 2b, 3).

6. The preform (1) as claimed in claim 1, characterised in that the outer surface of the first area (2a) of the first layer (2, 2a, 2b) and/or the outer surface of the second layer (3) includes a labelling or graphic which is deposited by hotfoil stamping, pad printing, screen-printing and/or by using a laser.

7. The preform (1) as claimed in claim 1, characterised in that the outer surface of the first area (2a) of the first layer (2, 2a, 2b) and/or the outer surface of the second layer (3) has at least partially a contour which has concave or convex curvatures or prisms with pointed or rounded extensions.

8. The preform (1) as claimed in claim 1, wherein the thread (5) is formed either from the material of the first layer (2, 2a, 2b) or from a material that differs from that of the first layer (2, 2a, 2b) and second layer (3).

9. The preform (1) as claimed in claim 1, wherein the second layer (3) is arranged with a continuously decreasing layer thickness, in the longitudinal direction of the preform (1) directed towards the open end of the preform (1).

10. The preform (1) as claimed in claim 1, wherein a flange (6) is arranged being adjacent to the thread (5) and to the second layer (3) in the longitudinal direction of the preform (1).

11. The preform (1) as claimed in claim 1, wherein the first layer (2) is formed in a first process step and the second layer (3) is formed in a second process step, wherein the first layer is formed as a completely continuous layer in the longitudinal and the circumferential directions of the preform (1) during the first process step.

12. The preform (1) as claimed in claim 1, wherein the second layer (3) has a layer thickness which varies in the longitudinal direction of the preform (1) at least in sections, wherein the second layer (3) has a layer thickness which essentially continuously increases in the circumferential direction of the preform (1) at least in sections.

13. The preform (1) as claimed in claim 1, wherein the first layer (2, 2a, 2b) has one single continuous second area (2b) which is covered by the second layer (3).

14. The preform (1) as claimed in claim 1, wherein the plane intersects precisely one first area (2a) of the first layer (2) and precisely one second area (2b) of the first layer (2).

15. The preform (1) as claimed in claim 1, wherein the preform (1) comprises joining areas between the first layer (2) and the second layer (3), wherein in the circumferential direction of the preform (1), the joining areas are arranged at different positions with respect to the longitudinal direction of the preform (1).

16. The preform (1) as claimed in claim 15, wherein there are at most two joining areas being arranged at the same position with respect to the longitudinal direction of the preform (1).

17. A preform (1) produced by a multi-component injection moulding method that produces a sleeve-shaped preform (1) which has at least two layers (2, 2a, 2b, 3), wherein the first layer (2, 2a, 2b) and second layer (3) have different material compositions, and wherein the second layer (3) has a layer thickness which varies in the circumferential and/or longitudinal direction(s) of the preform (1) at least in sections, wherein the preform (1) has a wall thickness which is essentially constant in the longitudinal and the circumferential directions, and wherein the preform (1) has an open end and an opposing closed end wherein the closed end comprises and outer surface, wherein the second layer (3) constitutes the outer surface of the closed end of the preform, wherein the first layer is a completely continuous layer and forms the inner layer of the preform, said method comprising at least two process steps including at least two cavities and at least one injection mould core that can be used for both cavities, characterised in that during the first process step, the first layer (2, 2a, 2b), which has at least one first (2a) and at least one second area (2b) extending at least partially in the circumferential direction of the preform (1) during the first process step, is injected onto the injection mould core within the first cavity, wherein the first layer (2, 2a, 2b) is formed as a continuous layer in the longitudinal and the circumferential directions of the preform (1), with the second area (2b) having a lower layer thickness than the first area (2a), and during the second process step, in the second cavity the second layer (3) is deposited on the first layer (2, 2a, 2b) which is located on the injection mould core in the second cavity in such a way that the second layer (3) covers only the second area (2b) of the first layer (2, 2a, 2b), wherein the first layer (2) is injected having a varying layer thickness in the circumferential direction of the preform (1) in a plane arranged perpendicular to the longitudinal direction of the preform (1), wherein the plane intersects the first area (2a) of the first layer (2) and is located between the thread (5) and the closed end of the preform (1).

18. The preform (1) as claimed in claim 17, further comprising a thread (5) on an open end wherein the thread (5) is formed either from the material of the first layer (2, 2a, 2b) or from a material that differs from that of the first layer (2, 2a, 2b) and second layer (3).

19. The preform (1) as claimed in claim 18, wherein a flange (6) is formed being adjacent to the thread (5) and to the second layer (3) in the longitudinal direction of the preform (1).

20. The preform (1) as claimed in claim 17, wherein the second layer (3) is injected having a continuously decreasing layer thickness, in the longitudinal direction of the preform (1) directed towards the open end of the preform (1).

21. The preform (1) as claimed in claim 17, wherein the plane intersects precisely one first area (2a) of the first layer (2) and precisely one second area (2b) of the first layer (2).

22. The preform (1) as claimed in claim 17, wherein the preform (1) comprises joining areas between the first layer (2) and the second layer (3), wherein in the circumferential direction of the preform (1), the joining areas are arranged at different positions with respect to the longitudinal direction of the preform (1).

23. The preform (1) as claimed in claim 22, wherein there are at most two joining areas being arranged at the same position with respect to the longitudinal direction of the preform (1).

* * * * *